United States Patent
Kelley

(10) Patent No.: US 7,017,763 B2
(45) Date of Patent: Mar. 28, 2006

(54) BASE HAVING A FLEXIBLE VACUUM AREA

(75) Inventor: Paul V. Kelley, Thurmont, MD (US)

(73) Assignee: Graham Packaging Company, L.P., York, PA (US)

( * ) Notice: Subject to any disclaimer, the term of this patent is extended or adjusted under 35 U.S.C. 154(b) by 178 days.

(21) Appl. No.: 10/625,508

(22) Filed: Jul. 24, 2003

(65) Prior Publication Data

US 2004/0164045 A1 Aug. 26, 2004

Related U.S. Application Data

(60) Provisional application No. 60/398,021, filed on Jul. 24, 2002.

(51) Int. Cl.
*B65D 1/42* (2006.01)

(52) U.S. Cl. .................. 215/383; 215/381; 220/606; 220/609

(58) Field of Classification Search ............... 215/373, 215/375, 381; 220/606, 608, 609; D9/520
See application file for complete search history.

(56) References Cited

U.S. PATENT DOCUMENTS

| | | | |
|---|---|---|---|
| 3,426,939 A * | 2/1969 | Young | 220/609 |
| 3,434,626 A * | 3/1969 | Kinslow, Jr. | 220/608 |
| 4,108,324 A | 8/1978 | Krishnakumar et al. | |
| 4,134,510 A | 1/1979 | Chang | |
| 4,197,954 A * | 4/1980 | Oltman et al. | 215/373 |
| 5,005,716 A | 4/1991 | Eberle | |
| 5,158,817 A * | 10/1992 | Krishnakumar | D8/48 |
| 5,222,615 A * | 6/1993 | Ota et al. | 215/375 |
| 5,269,437 A * | 12/1993 | Gygax | 220/606 |
| 5,337,909 A | 8/1994 | Vailliencourt et al. | |
| 5,908,127 A * | 6/1999 | Weick et al. | 215/373 |
| D411,803 S * | 7/1999 | Guertin | D9/520 |
| D412,119 S * | 7/1999 | Guertin | D9/520 |
| 5,971,184 A * | 10/1999 | Krishnakumar et al. | 215/384 |
| D421,721 S * | 3/2000 | Guertin | D9/520 |
| 6,277,321 B1 * | 8/2001 | Vailliencourt et al. | 264/529 |
| 2001/0035392 A1 * | 11/2001 | Ota et al. | 215/381 |
| 2002/0074336 A1 * | 6/2002 | Silvers | 220/623 |

FOREIGN PATENT DOCUMENTS

| | | | |
|---|---|---|---|
| EP | 1354801 A1 * | 10/2003 | |
| JP | 408301253 A * | 11/1996 | |
| JP | 2001315741 A * | 11/2001 | |
| WO | WO 97/34808 | 9/1997 | |

* cited by examiner

*Primary Examiner*—Sue A. Weaver
(74) *Attorney, Agent, or Firm*—Venable; James R. Burdett; Jeffri A. Kaminski

(57) ABSTRACT

A non-round base structure for a hot-fill plastic container provides the container with enhanced structural integrity. The base structure is roughly rectangular and is composed of a flexible vacuum absorbing area and a bearing edge which support the container in an upright position. The flexible vacuum absorbing area abates with a central ellipse shaped push-up, which is a concave surface. A series of ribs with an outward facing rounded edges are fashioned on the concave surface. The ribs extend outwardly from the center of the ellipse. The disclosed base structure enables the container to withstand the various forces encountered in filling, cooling and handling.

18 Claims, 3 Drawing Sheets

BASE HAVING A FLEXIBLE VACUUM AREA

CROSS-REFERENCE TO RELATED APPLICATIONS

This application claims priority under 35 U.S.C. § 119(e)(1) of provisional application No. 60/398,021, filed Jul. 24, 2002.

BACKGROUND OF THE INVENTION

1. Field of the Invention

The present invention relates generally to a blow-molded container having a base structure which enhances the structural integrity of the container, and more particularly to a non-round base structure having a heel-push-up design.

2. Related Art

Many beverage products are sold to the consuming public in plastic containers such as those that are shown in U.S. Pat. No. 5,005,716 (Eberle), U.S. Pat. No. 4,108,324 (Krishnakumar et al.), and U.S. Pat. No. 4,134,510 (Chang). The design of plastic containers must take into account the container's structural integrity, the manufacturing cost to mass-produce the container, and the aesthetic appearance of the container to the eye of the consumer.

A hot-fillable plastic beverage container must be structurally sound to withstand various forces relating to the so-called "hot-fill" process. Moreover, it must withstand rough handling during transportation to the ultimate consumer. A "hot-fill" process is the procedure by which containers are filled with a beverage at a high temperature after which the containers are capped. As the beverage cools within the container, stresses and strains develop in the container due to changes in the volume of the contents. Containers that store products under pressure, such as carbonated beverages, also experience pressure changes due to changes in ambient temperature. A commercially satisfactory container structure must not only withstand these forces from a structural viewpoint, but it must also present an aesthetically pleasing appearance to the ultimate consumer.

The price of many products sold to the consuming public is affected to an extent by the cost of packaging. With plastic beverage containers, the cost of manufacturing a container is affected by the cost of plastic composing the container. Therefore, if the amount of plastic in a container can be reduced (i.e., a process known as "light weighting"), the cost of manufacturing the container can be reduced commensurately. However, in achieving this goal it is known that the thinner the walls and base of the container become, the greater the need is to utilize imaginative designs to provide a container that is commercially acceptable.

The desire to decrease the amount of plastics used in a container has resulted in the development of different techniques to design containers that have structural integrity with minimal use of plastic. It is known that the shape and location of structural elements such as ribs, hinges, panels, and the like can affect the container's overall structural integrity. While various structural elements molded in the side panel and base structure can afford structural integrity, they must also be visually appealing to the consumer.

Krishnakumar et al ('324) illustrate a rounded container base structure, which employs various structural elements molded into the base that enhances structural integrity. This base design has a series of radially extending ribs, which allow the base structure to withstand a variety of applied forces and which minimize the use of plastic.

Eberle ('716) discloses a round base structure having a central concavity and a convex heel. The heel surrounds the concavity and merges with the concavity and the container sidewall. A plurality of hollow convex ribs, distributed in a symmetrical array, interrupt the outer surface of the concavity and merge smoothly therewith, each rib extending longitudinally in the direction of the heel and downwardly from an inner portion of the concavity. The wall of the bottom structure generally decreases in thickness progressively from the innermost point of the concavity to the sidewall. The structure allows the base to withstand the various stresses and strains applied to the container and also minimizes the use of plastic.

Chang ('510) shows a round base, which employs a series of circumferential ribs in combination with radial ribs to provide the desired degree of structural integrity. The radial ribs intersect all of the circumferential ribs. The various ribs are solid.

The well known 1.75-liter Tropicana Twister® (a registered trademark of Tropicana Products, Inc., 1001 13th Avenue, East Bradenton, Fla. 33506) plastic beverage container has a rounded heel/push-up base design with a very narrow heel surface which functions as the horizontal bearing surface. However, the 1.75-liter Tropicana Twister plastic beverage container contains no vacuum base flex area in its base.

Although the aforementioned containers and base structures may function satisfactorily for their intended purposes, there remains a continuing need for a blow-molded plastic container having a base structure which enhances container structural integrity while requiring a minimum use of plastic. Also, these base structures need to be aesthetically pleasing and be capable of being manufactured in conventional high-speed equipment.

BRIEF SUMMARY OF THE INVENTION

The substantially non-rounded base structure of the invention incorporates a flexible vacuum absorbing area along with an ellipsoid-shaped heel/push-up structure. The design allows for a stable horizontal base and a capability to reduce the gram weight of the container while enhancing performance of the containers vacuum absorption capacity and/or broadens container design possibilities.

The more conventional method has been to use a typical round bottle heel/push up style. This causes the base to be heavier and also less capable of flexing for vacuum absorption that makes it more difficult to light weight the container.

The general function of the flexible vacuum absorbing area works by creating a flex area between the substantially non-round (e.g., ellipsoid-shaped) push-up and heel radius of the bottle sidewall. This area is relatively constant between the non-round (ellipsoid-shaped) push-up and heel radius of the bottle sidewall. In contrast, the conventional rounded base has a more dramatic difference in the area from the corners of the container to the centers. The cord lengths which define the flex area can vary in length but preferably do not exceed a difference of more than about twenty five percent. This difference allows the flex area in the non-round push up to function more efficiently during cooling for vacuum absorption and also creates a bearing edge for the bottle to sit more stably than existing like structures.

The present invention provides a novel container base structure which improves the overall structural integrity of the container which, in addition, uses a minimum of plastic material. A further object of the present invention is to provide a container base structure which does not detract from the aesthetics of the container even after it has been subject to various stresses and strains associated with filling, transportation and handling. A further object of the present invention is to provide a container having an improved base structure, which affords manufacture by high speed, automated equipment at a minimum of cost.

The base structure has a support heel, which has an inner and an outer portion. The outer portion of the support heel merges with the container sidewall. The inner portion of the support heel merges with a central concave wall, the central concave wall being surrounded by the annular support heel.

The central concave wall has a plurality of ribs. These ribs form a symmetrical array. The specific number of these ribs can vary. The ribs and concave surface cooperate to enhance the structural integrity of the container base.

Preferably, the blow-molded container according to the present invention may suitably comprise polyethylene terephthalate, which is also known more commonly as PET. PET is a semi-crystalline thermoplastic. Depending on its transformation state, PET can be found in a totally "amorphous" or a "semi-crystalline" form. In the latter case, its morphology is comprised of amorphous and crystallized phases. In its amorphous state, PET's molecular chains are not organized, sort of like a big ball of yarn. Conversely, in its crystallized state, PET's molecular structure is a dense and organized arrangement of molecular chains.

Further objectives and advantages, as well as the structure and function of preferred embodiments will become apparent from a consideration of the description, drawings, and examples.

BRIEF DESCRIPTION OF THE DRAWINGS

The foregoing and other features and advantages of the invention will become apparent from the following, more particular description of a preferred embodiment of the invention, as illustrated in the accompanying drawings wherein like reference numbers generally indicate identical, functionally similar, and/or structurally similar elements.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention. All references cited herein are incorporated by reference as if each had been individually incorporated.

Figure 1:
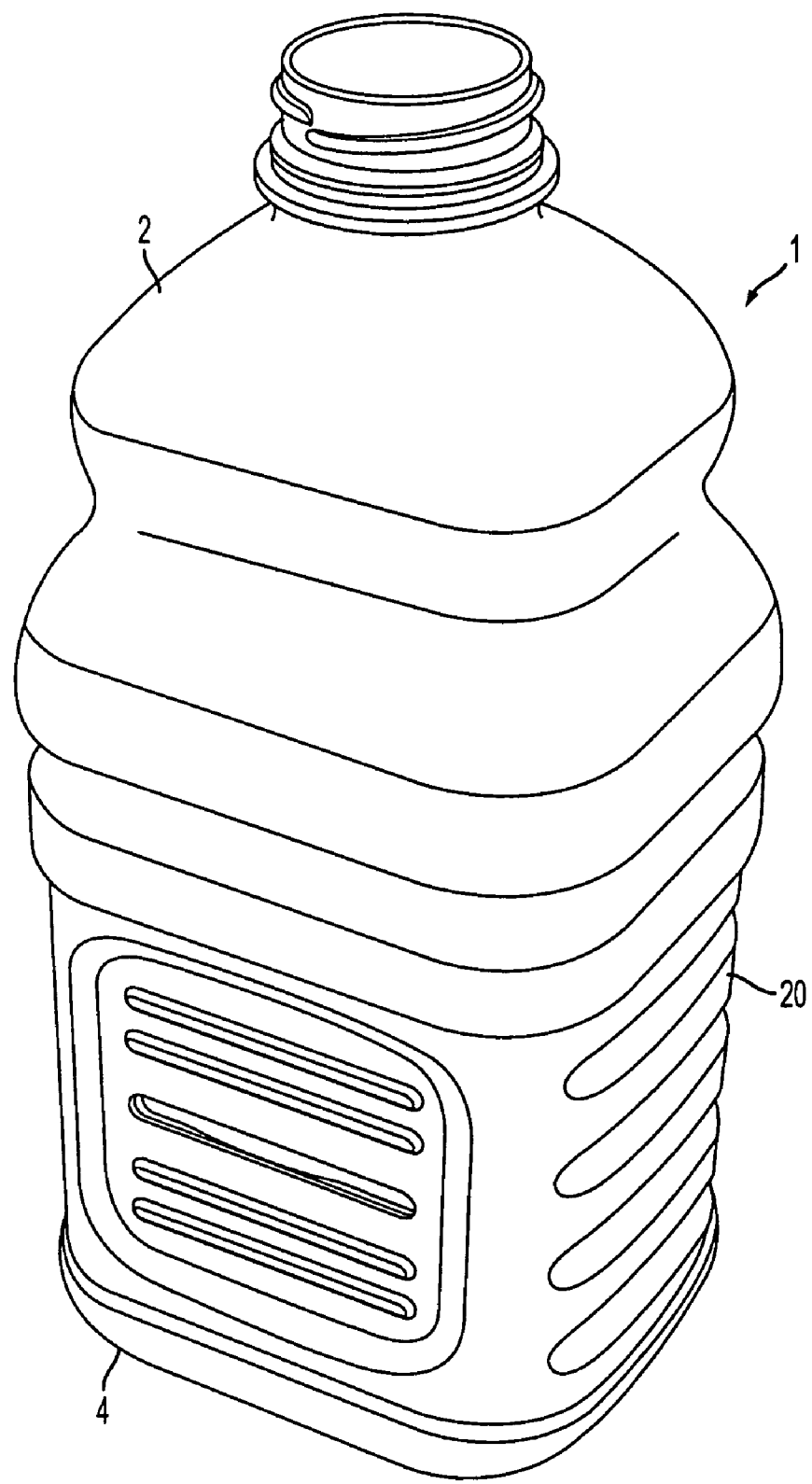
FIG. 1 shows a three-dimensional view of a rectangular container with a ribbed vacuum side panel and the base structure of the invention.
Figure 2:
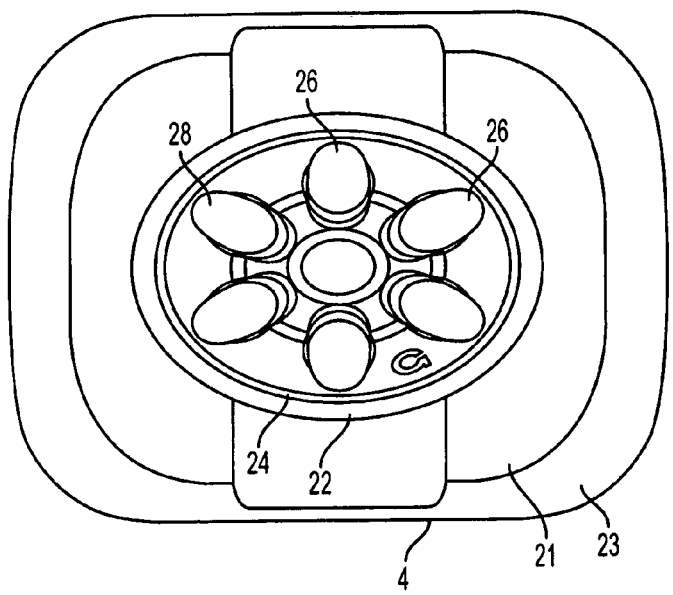
FIG. 2 shows an enlarged view of the base structure shown in FIG. 1.

Referring now to the drawings, FIG. 1 illustrates a blow-molded plastic non-round container (1) such as may be used in the sale of juices and other non-carbonated beverages. The container has rectangular sides. Such containers can typically be designed to contain liquid volumes of 64 ounces, a gallon, or higher. The container (1) has a neck (2) defining an opening allowing for filling and pouring of a beverage. The neck (2) merges with the rectangular sidewalls (20). The rectangular sidewalls (20) merge with the non-round base structure (4) opposite the neck. The container (1) is designed to receive a cap (not shown) to seal the container and confine the beverage inside the container. While the sidewalls as shown are rectangular, any substantially rectangular shape including a square shape can be utilized. In such an embodiment, the base would be shaped appropriately to merge with the sidewall.

When used in hot-fill processing, the container is filled with a beverage at an elevated temperature. The cap is then installed on the container neck. As the temperature of the beverage and air decreases to ambient temperatures, its volume decreases. The container and its base structure must react to the reduction in volume and accommodate the stresses and strains while remaining structurally sound. Moreover, the base must also be capable of withstanding various other forces, such as changes in internal pressure with carbonated beverages, and the usual handling forces.

Figure 3:
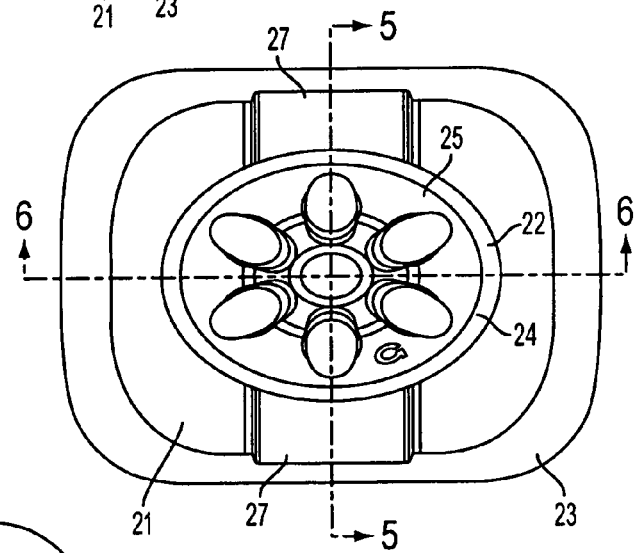
FIG. 3 shows a planar view of the base structure shown in FIGS. 1 and 2, illustrating an ellipsoid shaped concave surface with a symmetric array of ribs with cross sectional cuts 5—5 and 6—6 identified.

The base structure of the present invention is shaped to withstand these various forces. The base structure reduces the need for plastic, yet still enhances the overall structural integrity of the container. To this end, as seen in FIG. 3, for example, the base structure has a substantially ellipsoidal shaped support heel (21). The support heel (21) allows the container (1) to be supported erect on a horizontal surface. The support heel (21) is rounded and forms a continuous line of contact with a horizontal surface (not shown). Included in the support heel structure are recessed structures (27), which can enhance the horizontal stability of the container (1) when placed on a flat surface.

Figure 4:
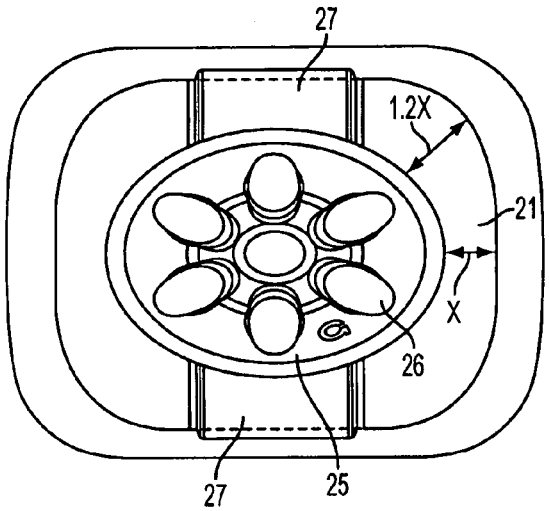
FIG. 4 shows a planar view of the base structure shown in FIGS. 1 and 2, illustrating an ellipsoid shaped concave surface with a symmetric array of ribs.
Figure 5:
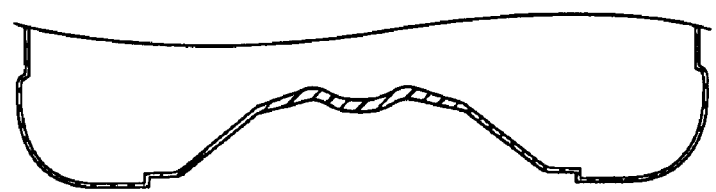
FIG. 5 shows a cross section 5—5 of FIG. 3, with the shaded area illustrating the relative thickness of the container wall.
Figure 6:
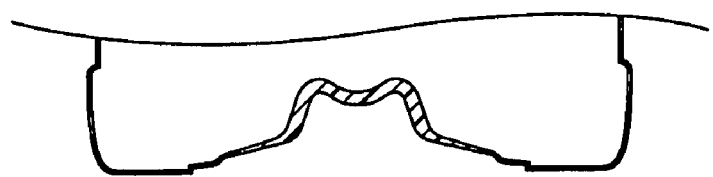
FIG. 6 shows cross section 6—6 of FIG. 3, with the shaded area illustrating the relative thickness of the container wall.
Figure 7:
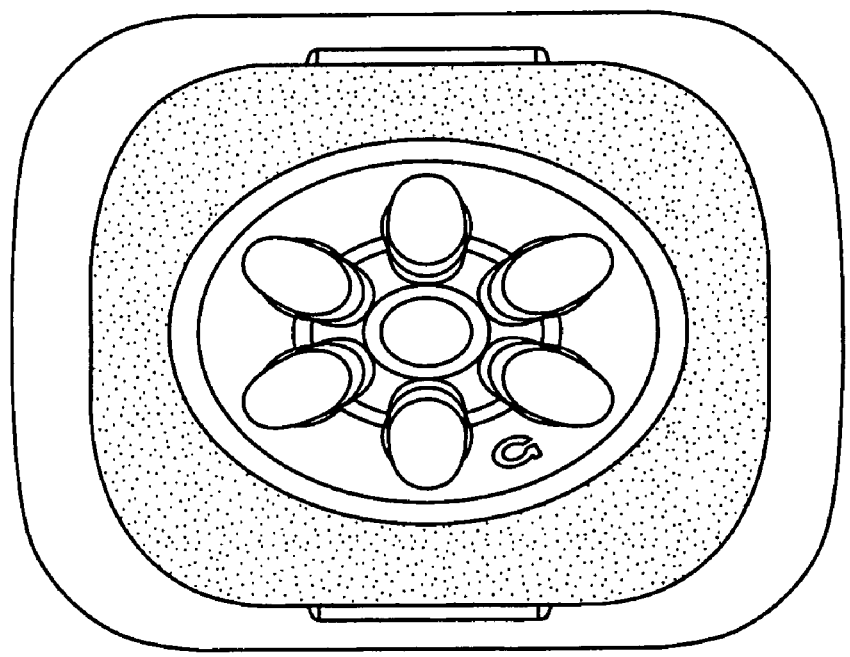
FIG. 7 shows a planar view of the base structure where the flex area is shown in stiple. The flex area typically does not exceed a 25% difference in cord length as measured from the inside edge to the outside edge.

The support heel (21) has an inner and an outer portion, (22) and (23), respectively. The outer portion (23) merges with the container's rectangular sidewalls (20). The inner portion (22) of the annular support heel (21) has an upwardly inclined surface (24), which merges with a central concave wall (25). The support heel (21) can be flexible in the region between the inner portion (22) and the outer portion (23). The support heel (21) can define a cord length X, which extends in a substantially radial direction between the inner portion (22) and the outer portion (23), as shown in FIG. 4. Preferably, the cord length X does not change more by more than about 25% as it extends around the base (4) of the container (1). That is, the cord length at its longest point is preferably no more than 1.25 times the cord length at its shortest point. For example, as show in the embodiment of FIG. 4, the cord length is X at its shortest point and 1.2 times X at its longest point.

The central concave wall (25) is provided with integral molded structural elements that provide the base (4) with sufficient structural integrity to withstand the various forces acting on the container (1). To this end, the central concave wall (25) has a plurality of ribs (26), which extend from the center outward. The ribs have a rounded edge (28), which extends outward relative to the interior of the container. The ribs can form a symmetric array. See, e.g., FIGS. 2–4 and 7.

As shown in FIGS. 2–4 and 7, the central concave wall (25) is illustrated with an array of six ribs. However, a greater or fewer number of ribs can be used so long as the function is achieved.

Containers having this base structure design can be produced in commercial quantities with high-speed equipment.

All references cited in this specification are hereby incorporated by reference. The discussion of the references herein is intended merely to summarize the assertions made by their authors and no admission is made that any reference constitutes prior art relevant to patentability. Applicant reserves the right to challenge the accuracy and pertinency of the cited references.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A non-round base structure for a blow-molded container having rectangular sidewalls, comprising:
    a support heel comprising a bearing edge and a flexible vacuum absorbing area having an outer portion and a roughly ellipsoidal inner portion, said outer portion merging with the container rectangular sidewalls and said inner portion merging with a central concave wall;
    the central concave wall having an apex and a plurality of ribs extending outward from the apex along the concave wall, each rib having a rounded edge extending outward from the interior of the container; and
    whereby the vacuum absorbing area and ribs cooperate to enhance the structural integrity of the container by rigidifying said central concave wall and by providing multiple paths of interengageable surfaces that make it difficult for deflection, once initiated, to propagate to undesired distortion.

2. The non-round base structure for a blow-molded container of claim 1, wherein the outer portion is roughly ellipsoidal.

3. The non-round base structure for a blow-molded container of claim 2, wherein the flexible vacuum absorbing area enhances the support bearing edge upon container filling.

4. The non-round base structure for a blow-molded container of claim 2, wherein the flexible area defines a cord length between the inner portion and the outer portion, and the cord length is no more than about 25% longer at its longest point than at its shortest point.

5. The base structure according to claim 1, wherein the ribs form a substantially symmetric array.

6. The base structure according to claim 5, wherein the array is substantially star-shaped.

7. The base structure according to claim 1, wherein there are at least about six ribs.

8. The base structure of claim 1, wherein the vacuum flexible area partially surrounds the area defined by the concave wall.

9. The base structure of claim 8, wherein the vacuum flexible area is separated into two roughly symmetrical areas by recessed structures on opposite sides of the concave wall.

10. A base structure according to claim 1, wherein said base structure comprises polyethylene terephthalate.

11. A non-round base structure for a blow-molded container having rectangular sidewalls, comprising:
    a support heel comprising a bearing edge and a flexible vacuum absorbing area having a roughly rectangular outer portion and a roughly ellipsoidal inner portion, said outer portion merging with the container rectangular sidewalls and said inner portion merging with a central concave wall;
    the central concave wall having an apex and a plurality of ribs extending outward from the apex along the concave wall, each rib having a rounded edge extending outward from the interior of the container; and
    whereby the vacuum absorbing area and ribs cooperate to enhance the structural integrity of the container by rigidifying said central concave wall and by providing multiple paths of interengageable surfaces that make it difficult for deflection, once initiated, to propagate to undesired distortion.

12. The non-round base structure for a blow-molded container of claim 11, wherein the flexible vacuum absorbing area enhances the support bearing edge upon container filling.

13. The non-round base structure for a blow-molded container of claim 11, wherein the flexible area defines a cord length between the inner portion and the outer portion, and the cord length is no more than about 25% longer at its longest point than at its shortest point.

14. The base structure according to claim 11, wherein the ribs form a substantially star-shaped, symmetric array.

15. The base structure of claim 11, wherein the vacuum flexible area partially surrounds the area defined by the concave wall.

16. The base structure of claim 15, wherein the vacuum flexible area is separated into two roughly symmetrical areas by recessed structures on opposite sides of the concave wall.

17. A base structure according to claim 11, wherein said base structure comprises polyethylene terephthalate.

18. A non-round base structure for a blow-molded container having rectangular sidewalls, comprising:
    a support heel comprising a bearing edge and a flexible vacuum absorbing area having a roughly ellipsoidal outer portion and a roughly ellipsoidal inner portion, said outer portion merging with the container rectangular sidewalls and said inner portion merging with a central concave wall, wherein the flexible vacuum absorbing area is adapted to enhance the support bearing edge upon container filling and defines a cord length between the inner portion and the outer portion that is no more than about 25% longer at its longest point than at its shortest point;
    the central concave wall having an apex and a plurality of ribs extending outward from the apex along the concave wall to form a substantially star-shaped symmetric array, each rib having a rounded edge extending outward from the interior of the container; and
    whereby the vacuum absorbing area and ribs cooperate to enhance the structural integrity of the container by rigidifying said central concave wall and by providing multiple paths of interengageable surfaces that make it difficult for deflection, once initiated, to propagate to undesired distortion.

* * * * *